(12) United States Patent
Weissenberg

(10) Patent No.: US 10,118,697 B2
(45) Date of Patent: Nov. 6, 2018

(54) UNMANNED AERIAL VEHICLE

(71) Applicant: Riderless Technologies Inc., North Vancouver (CA)

(72) Inventor: Stefan Weissenberg, North Vancouver (CA)

(73) Assignee: Riderless Technologies Inc., North Vancouver (CA)

( * ) Notice: Subject to any disclaimer, the term of this patent is extended or adjusted under 35 U.S.C. 154(b) by 197 days.

(21) Appl. No.: 15/192,438

(22) Filed: Jun. 24, 2016

(65) Prior Publication Data

US 2017/0029101 A1   Feb. 2, 2017

Related U.S. Application Data

(60) Provisional application No. 62/184,611, filed on Jun. 25, 2015.

(51) Int. Cl.
*B64C 27/08*   (2006.01)
*B64C 39/02*   (2006.01)
*B64C 27/00*   (2006.01)

(52) U.S. Cl.
CPC .......... *B64C 39/024* (2013.01); *B64C 27/006* (2013.01); *B64C 2201/027* (2013.01); *B64C 2201/127* (2013.01); *B64C 2201/128* (2013.01); *B64C 2201/203* (2013.01)

(58) Field of Classification Search
CPC . B64C 27/006; B64C 27/08; B64C 2201/024; B64C 2201/027; B64C 2201/20; B64C 2201/201; B64C 2201/203; B64C 2201/205; B64C 2201/206; B64C 2201/208; A63H 27/12
See application file for complete search history.

(56) References Cited

U.S. PATENT DOCUMENTS 6,056,237 A   5/2000   Woodland
6,388,611 B1   5/2002   Dillman
(Continued)

FOREIGN PATENT DOCUMENTS

CA   2840582 A1   1/2012
CA   2840554 A1   3/2012
(Continued)

OTHER PUBLICATIONS

Canadadrones.com, Product Description, DJI Phantom Prop Guard http://www.canadadrones.com/DJI-Phantom-Prop-Guards-Canada-p/dji-phantom-prop-guard.htm, 3 pages (archived Oct. 2013).
(Continued)

*Primary Examiner* — Joseph W Sanderson
(74) *Attorney, Agent, or Firm* — LeClairRyan PLLC

(57) ABSTRACT

There is provided an unmanned aerial vehicle (UAV) with a flexible propeller guard. The flexible propeller guard may allow the UAV to be resiliently repelled from objects in the UAV's flight path, thereby protecting one or more of the UAV's propellers. The UAV may have foldable arms, movable between a deployed configuration and a stored configuration, and the flexible propeller guard may be used to restrain the folded arms in the stored configuration. The flexible propeller guard may be arranged so as to not interfere with the foldability of the arms.

15 Claims, 15 Drawing Sheets

(56) References Cited

U.S. PATENT DOCUMENTS

| | | | | |
|---|---|---|---|---|
| 7,273,195 | B1* | 9/2007 | Golliher | A63H 27/12 244/17.11 |
| 8,147,289 | B1* | 4/2012 | Lee | A63H 27/12 446/36 |
| 8,292,215 | B2 | 10/2012 | Olm et al. | |
| 8,322,648 | B2 | 12/2012 | Kroetsch et al. | |
| 8,888,035 | B2* | 11/2014 | Lind, Jr. | B60F 3/00 244/13 |
| 8,946,607 | B2* | 2/2015 | Gettinger | B64C 39/024 244/3.27 |
| 9,004,973 | B2* | 4/2015 | Condon | A63H 13/00 446/37 |
| 9,038,938 | B2* | 5/2015 | Muren | A63H 27/12 244/4 R |
| 9,150,069 | B2* | 10/2015 | Kalantari | A63H 27/12 |
| 9,260,184 | B2* | 2/2016 | Olm | B64C 27/08 |
| 9,309,006 | B2* | 4/2016 | Zwaan | B64C 39/024 |
| 9,365,088 | B2* | 6/2016 | Belik | B64C 35/008 |
| 9,488,978 | B2* | 11/2016 | Callou | G05D 1/0204 |
| 9,533,758 | B2* | 1/2017 | Gettinger | B64C 3/56 |
| 9,611,032 | B2* | 4/2017 | Briod | B64C 17/00 |
| 9,611,045 | B2* | 4/2017 | Erickson | B64D 25/00 |
| 9,783,294 | B2* | 10/2017 | Johannesson | B64C 39/024 |
| 9,841,761 | B2* | 12/2017 | Shehata | G05D 1/0027 |
| 9,850,004 | B2* | 12/2017 | Zwaan | B64D 47/08 |
| 2007/0168126 | A1 | 7/2007 | Wence et al. | |
| 2007/0215750 | A1* | 9/2007 | Shantz | A63H 27/12 244/17.23 |
| 2009/0283629 | A1* | 11/2009 | Kroetsch | A63H 27/12 244/17.23 |
| 2010/0108801 | A1 | 5/2010 | Olm et al. | |
| 2010/0224723 | A1* | 9/2010 | Apkarian | A63H 27/12 244/65 |
| 2011/0017865 | A1 | 1/2011 | Achtelik et al. | |
| 2011/0042508 | A1 | 2/2011 | Bevirt | |
| 2012/0043411 | A1* | 2/2012 | Beck | B64C 39/024 244/3.24 |
| 2012/0153087 | A1* | 6/2012 | Collette | B64C 27/20 244/23 A |
| 2013/0054054 | A1* | 2/2013 | Tollenaere | B64D 1/22 701/3 |
| 2013/0146716 | A1* | 6/2013 | Gettinger | B64C 3/56 244/215 |
| 2013/0193269 | A1* | 8/2013 | Zwaan | B64C 39/024 244/118.1 |
| 2013/0218456 | A1 | 8/2013 | Zelek et al. | |
| 2013/0256464 | A1 | 10/2013 | Belik et al. | |
| 2013/0287577 | A1 | 10/2013 | Lin et al. | |
| 2014/0032034 | A1* | 1/2014 | Raptopoulos | G08G 5/0069 701/25 |
| 2014/0099853 | A1* | 4/2014 | Condon | G05D 1/0033 446/37 |
| 2014/0217242 | A1* | 8/2014 | Muren | A63H 27/12 244/4 R |
| 2014/0339355 | A1* | 11/2014 | Olm | B64C 27/08 244/17.23 |
| 2015/0057844 | A1* | 2/2015 | Callou | G05D 1/0204 701/3 |
| 2015/0142211 | A1* | 5/2015 | Shehata | H04N 7/181 701/2 |
| 2015/0259066 | A1* | 9/2015 | Johannesson | B64C 27/08 244/17.27 |
| 2015/0321759 | A1* | 11/2015 | Caubel | B64C 39/024 244/17.23 |
| 2015/0360776 | A1* | 12/2015 | Briod | B64C 17/00 244/23 A |
| 2016/0001875 | A1* | 1/2016 | Daler | B64C 17/00 244/17.23 |
| 2016/0001879 | A1* | 1/2016 | Johannesson | B64C 27/50 416/142 |
| 2016/0101368 | A1* | 4/2016 | Rehkemper | A63H 27/12 446/58 |
| 2016/0137293 | A1* | 5/2016 | Santangelo | B64C 39/024 244/50 |
| 2016/0176503 | A1* | 6/2016 | Gettinger | B64C 3/56 244/3.27 |
| 2016/0176520 | A1* | 6/2016 | Goldstein | B64C 39/024 244/17.17 |
| 2016/0221671 | A1* | 8/2016 | Fisher | B64C 27/08 |
| 2016/0251087 | A1* | 9/2016 | Zwaan | B64C 39/024 244/118.1 |
| 2016/0280359 | A1* | 9/2016 | Semke | B64C 25/32 |
| 2016/0340021 | A1* | 11/2016 | Zhang | B64C 27/08 |
| 2016/0368610 | A1* | 12/2016 | Erickson | B64D 25/00 |
| 2016/0375999 | A1* | 12/2016 | Belik | B64C 35/008 244/1 R |
| 2017/0043869 | A1* | 2/2017 | Howard | B64C 39/024 |
| 2017/0126935 | A1* | 5/2017 | Tai | H04N 5/2252 |
| 2017/0225782 | A1* | 8/2017 | Kohstall | B64C 39/024 |
| 2017/0253325 | A1* | 9/2017 | Zou | B64C 27/006 |
| 2017/0291697 | A1* | 10/2017 | Kornatowski | B64C 27/006 |
| 2017/0305548 | A1* | 10/2017 | Ozaki | B64C 39/024 |

FOREIGN PATENT DOCUMENTS

| | | |
|---|---|---|
| CN | 101391651 A | 3/2009 |
| CN | 201367115 Y | 12/2009 |
| CN | 101992854 A | 3/2011 |
| CN | 102180267 A | 9/2011 |
| CN | 202244078 U | 5/2012 |
| CN | 202358299 U | 8/2012 |
| CN | 202512236 U | 10/2012 |
| CN | 202966657 U | 6/2013 |
| CN | 203461140 U | 3/2014 |
| CN | 203698658 U | 7/2014 |
| CN | 203975225 U | 12/2014 |
| CN | 104443376 A | 3/2015 |
| CN | 204223178 U | 3/2015 |
| CN | 204310039 U | 5/2015 |
| CN | 204489175 U | 7/2015 |
| CN | 104843191 A | 8/2015 |
| CN | 204587305 U | 8/2015 |
| CN | 204776022 U | 11/2015 |
| CN | 204871603 U | 12/2015 |
| CN | 204895868 U | 12/2015 |
| CN | 205087129 U | 3/2016 |
| DE | 102009001759 A1 | 10/2010 |
| EP | 1901153 A1 | 3/2008 |
| EP | 2151379 A2 | 2/2010 |
| EP | 2233393 A2 | 9/2010 |
| EP | 2570345 A1 | 3/2013 |
| EP | 2588368 A1 | 5/2013 |
| EP | 2604510 A2 | 6/2013 |
| WO | WO2009151351 A1 | 12/2009 |
| WO | WO2011149544 A1 | 12/2011 |
| WO | WO2012039810 A1 | 3/2012 |
| WO | WO2012130790 A2 | 10/2012 |
| WO | WO2012143717 A2 | 10/2012 |
| WO | WO2013144508 A1 | 10/2013 |
| WO | WO2013163746 A1 | 11/2013 |
| WO | WO2014059549 A1 | 4/2014 |
| WO | WO2014141154 A1 | 9/2014 |

OTHER PUBLICATIONS

Aeryon.com, Product Description, Aeryon SkyRanger the benchmark for VTOL sUAS http://www.aeryon.com/aeryon-skyranger, 7 pages (archived May 2015).

Alecedo.com, Drone Student Project Description http://www.alcedo.ethz.ch/#, 1 page (accessed May 2015).

* cited by examiner

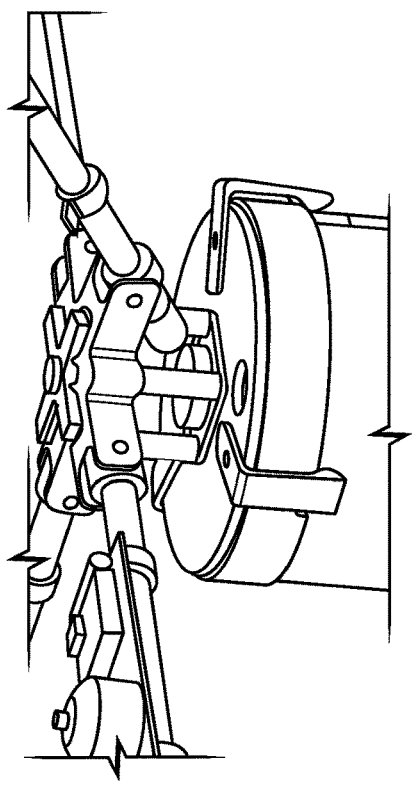
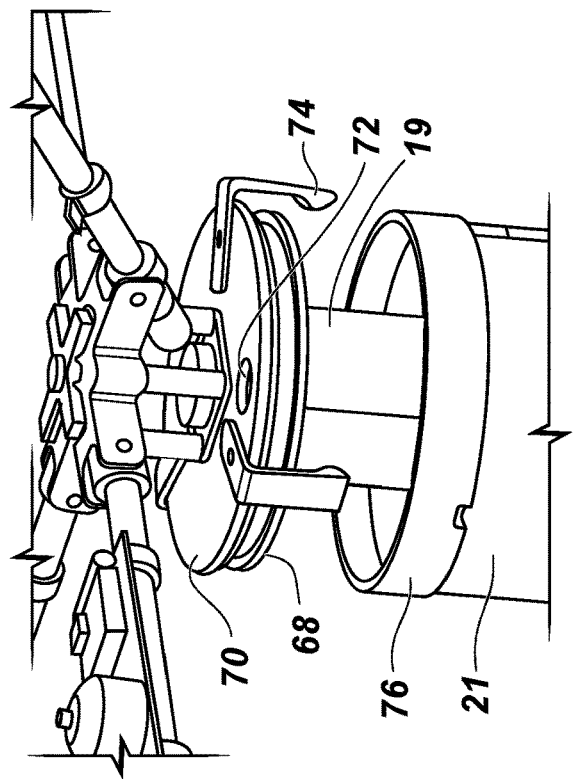
FIG. 10B
FIG. 10A

UNMANNED AERIAL VEHICLE

This application claims the benefit of U.S. Provisional Patent Application Ser. No. 62/184,611, filed Jun. 25, 2015, which is hereby incorporated by reference in its entirety.

FIELD OF THE DISCLOSURE

The present disclosure relates to an unmanned aerial vehicle, or UAV, and to a propeller guard for a UAV.

BACKGROUND TO THE DISCLOSURE

Over the last decade, UAVs have become increasingly economical and popular, with advances in lithium polymer batteries, brushless motors and small, low-cost, powerful electronics. UAVs can be used for a wide variety of applications including military surveillance, agricultural surveying, aerial filmmaking and photography, inspection of power lines and pipelines, wildlife counting, enforcement of anti-poaching laws in protected areas, borders patrols, forest fire detection, and search and rescue. Small UAVs can also be useful as personal scouting and safety devices for skiers, hikers, white-water rafters and climbers adventuring in remote backcountry areas.

The multi-rotor is a specific type of UAV with multiple motors and propellers providing predominantly upward thrust to counteract the aircraft's weight, with attitude control being provided by several possible methods including thrust differentiation and tilting of the rotor planes. In an unpredictable outdoor environment or during hazardous missions such as nighttime search-and-rescue, unexpected collisions can occur even when the UAV is under control of a trained pilot or with the use modern collision avoidance systems. In a collision, the exposed spinning blades of a multi-rotor can easily cause damage to a person, object or to the multi-rotor itself. Blade contact with a hard object typically results in a broken propeller or a bent motor shaft. For this reason, multi-rotors are often equipped with propeller guards which may be fixed or detachable (for example as described in U.S. Pat. No. 8,322,648, or as marketed for the DJI Phantom 1), and which form a protective shield around the most dangerous and exposed parts of the blades.

Such propeller guards however are not without their disadvantages. For example, typical propeller guards do not function well with folding-type UAVs, that is UAVs whose rotor arms are movable or foldable into a compact, stored position for ease of transport. With such UAVs the propeller guards first have to be detached from the UAV as otherwise they do not allow for easy transport. There therefore remains a need in the art for new and improved UAVs with propeller guards that at least partially address some of the drawbacks of current propeller guard systems. The present disclosure seeks to provide such a UAV.

SUMMARY OF THE DISCLOSURE

In accordance with one aspect of the disclosure, there is provided an unmanned aerial vehicle (UAV). The UAV comprises one or more propellers defining, during operation of the one or more propellers, a propeller operation zone comprising one or more areas swept by the one or more propellers. The UAV further comprises a flexible propeller guard extending beyond at least a portion of the propeller operation zone such that, during flight of the UAV, the flexible propeller guard protects at least one of the one or more propellers from collision. Each propeller may sweep a different respective area. The flexible propeller guard may be a string-like member or connector, such as string, cord, a cable, a wire, an elastic band, etc.

The propeller operation zone may comprise the area or volume extending between each of the areas swept by the one or more propellers. If the one or more propellers rotate in a common plane, then the propeller operation zone may comprise the area extending between each of the areas swept by the one or more propellers. If the one or more propellers rotate in different planes (for example planes tilted relative to the horizontal), then the propeller operation zone may comprise the volume extending between each of the areas swept by the one or more propellers.

When viewing the UAV along an axis of rotation of the one or more propellers, the flexible propeller guard may be spaced from at least one of the one or more areas swept by the one or more propellers. Thus, when viewing the UAV along an axis of rotation of the one or more propellers, the flexible propeller guard may be spaced horizontally relative to the plane of rotation of the one or more propellers.

The UAV may further comprise a plurality of arms extending radially away from a body portion of the UAV. At least one of the arms, when viewing the UAV along an axis of rotation of the one or more propellers, may extend beyond the propeller operation zone. The arms may be movable (for example by folding) between a stored configuration, in which the arms are aligned with one another, and a deployed configuration, in which the arms extend radially away from the body portion. The movable or foldable arms allow the UAV to be relatively easily transported, for example in a backpack. This is especially useful for UAVs that are designed for use in outdoor or remote wilderness areas. In the stored configuration, the aligned arms may extend in either direction away from the plane of rotation of the one or more propellers.

In the prior art, typical propeller guards wide enough to provide adequate protection to the propellers in flight will physically interfere with other propeller guards when the arms are folded. This may require removal of the propeller guards each time the UAV is packed for transport, which can be a significant inconvenience (as it increases the time taken to pack the UAV, it increases the number of parts, etc.). Advantageously, in embodiments of the disclosure the flexible propeller guard does not interfere with the moving of the arms between the stored and deployed configurations.

Each of the one or more propellers may be attached to one of the arms. More than one propeller may be attached to each arm.

The flexible propeller guard may have a length such that in the deployed configuration the flexible propeller guard is tensioned so as to be resiliently deformable. The tension may be such that, with the flexible propeller guard connecting the ends of two adjacent arms, at its midpoint the flexible propeller guard may be deflected by no more than 10 mm, or by no more than 5 mm, or by no more than 2 mm, or by no more than 1 mm.

The flexible propeller guard may be of a sufficient length that in the stored configuration the flexible propeller guard is wrappable around at least some of the arms so as to restrain the arms in the stored configuration. The flexible propeller guard may therefore both shield the propellers during flight of the UAV as well as allow for securing of the arms when in the stored configuration. The flexible propeller guard may translate relative to the arms such that, when the arms are folded into the stored configuration, the slack in the flexible propeller guard may be drawn out and used to secure the arms by wrapping the flexible propeller guard around the packed arms.

The UAV may further comprise a locking device engageable with the flexible propeller guard. The locking device may be configured when engaged to fix, on one side of the locking device, a first length of the flexible propeller guard relative to, on the other side of the locking device, a second length of the flexible propeller guard. The locking device may be a cord lock or similar device, as typically used with drawcords.

The flexible propeller guard may be threaded through at least one of the arms. The flexible propeller guard may be movably joined to at least some of the arms. For example, in one embodiment the flexible propeller guard may pass through a hole in an arm. In other embodiments, the flexible propeller guard may pass through an external structure such as a screw eyelet which is fastened to the arm.

The UAV may further comprise a body portion and a removable cover configured to substantially enclose the body portion. The body portion may comprise at least one camera having a lens movable so as to define a field of view. The removable cover may comprise a transparent area located such that, when the removable cover substantially encloses the body portion, the at least one camera may observe the field of view through the transparent area.

The UAV may comprise a first arm locking member movable between first and second positions such that, in the first position, movement of the arms into the stored configuration is blocked by the first arm locking member, and, in the second position, movement of the arms into the stored configuration is not blocked by the first arm locking member.

The UAV may comprise one or more second arm locking members joined to at least one of the arms and attachable to the body portion or the removable cover. The one or more second arm locking members may be of a length such that, when attached, the one or more second arm locking members bias the arms into the deployed configuration. The one or more second arm locking members may be string-like members, and may be elastic, such as elastic bands.

The UAV may comprise one or more resiliently deformable third arm locking members positioned so as to exert a clamping force on one or more ends of the arms when in the deployed configuration, so as to inhibit movement of the one or more arms away from the deployed configuration. The one or more third arm locking members may be configured so as to resiliently deform and release the one or more ends of the arms when sufficient force is applied to the one or more third arm locking members.

The UAV may further comprise one or more arm biasing devices translatable relative to the arms so as, when in the deployed configuration, to exert a biasing force against at least one of the arms, the biasing force being directed to bias the at least one of the arms away from the deployed configuration. The one or more arm biasing devices may comprise one or more screws.

The flexible propeller guard may extend beyond the entire propeller operation zone so as to form a complete perimeter around the UAV, when viewed along an axis of rotation of the one or more propellers.

The flexible propeller guard may extend beyond a portion of the propeller operation zone so as to form a partial perimeter around the UAV, when viewed along an axis of rotation of the one or more propellers.

The UAV may comprise one or more cargo containers. The one or more cargo containers may comprise a plurality of cargo containers positioned symmetrically relative to a body portion of the UAV.

In a further aspect of the disclosure, there is provided a method of protecting one or more propellers of an unmanned aerial vehicle (UAV) from collision. The method comprises providing a UAV having one or more propellers defining, during operation of the one or more propellers, a propeller operation zone comprising one or more areas swept by the one or more propellers. The method further comprises attaching a flexible propeller guard to the UAV such that the flexible propeller guard extends beyond at least a portion of the propeller operation zone, thereby, during flight of the UAV, protecting at least one of the one or more propellers from collision.

The flexible propeller guard may be joined to at least one attachment device. Attaching the flexible propeller guard may comprise attaching each of the at least one attachment device to a respective arm of the UAV. Each arm may extend radially away from a body portion of the UAV. Each of the at least one attachment device may have a first complementary structure configured to engage a corresponding second complementary structure of a respective arm. The flexible propeller guard may be movably joined to each arm.

Attaching the flexible propeller guard may comprise attaching each of the at least one attachment device to a respective end of each arm.

When viewed along an axis of rotation of the one or more propellers, each arm may extend beyond the propeller operation zone.

In a further aspect of the disclosure, there is provided a flexible propeller guard configured to be attached to an unmanned aerial vehicle (UAV). The UAV comprises one or more propellers defining, during operation of the one or more propellers, a propeller operation zone comprising one or more areas swept by the one or more propellers. The flexible propeller guard comprises attachment devices for coupling to corresponding attachment points on the UAV such that the flexible propeller guard, when attached to the UAV, extends beyond at least a portion of the propeller operation zone, thereby, during flight of the UAV, protecting at least one of the one or more propellers from collision. The attachment devices MAY have first complementary structures configured to engage corresponding second complementary structures of the attachment points.

At least one of the first complementary structures may be one of a male and a female member. At least one of the second complementary structures may be the other of a male and a female member.

The attachment points may be located on arms of the UAV. The arms may extend radially away from a body portion of the UAV.

The flexible propeller guard may be an optional feature of the UAV. In other words, without departing from the scope of the disclosure, the flexible propeller guard may be replaced with any of the above-described features. For instance, a UAV according to the scope of this disclosure may be devoid of the flexible propeller guard but may comprise one or more of the above-described arm locking members, arm biasing device, cargo containers, or any other feature described within this disclosure.

Further embodiments of the disclosure are described according to the following numbered clauses:

1. A multi-rotor UAV composed of three or more arms extending from a central body, and supporting motors and propellers which provide predominantly upward thrust, where: each arm is able to be folded along the vertical axis of the multi-rotor UAV by means of a hinge at the point of connection to a central structure, and the arms are locked in place during flight by a clamping force exerted by a secondary structure which is detachable or rotatable relative to the central structure, and a flexible connection exists between any two adjacent arms which is taut when the arms are secured in the flight position and becomes slack when the arms are folded into the packed position, and the flexible connector acts to secure the arms in the packed position by the use of any of: a cord-lock or other friction-type device; or a hand-tied knot 2. The multi-rotor UAV of clause 1, further comprising arms which extend as a continuous structure beyond the extremities of the propeller disc, such that a flexible connection passing through the end of the arms forms a protective shield around the propeller blades.

3. The multi-rotor UAV of clause 1, further comprising arms which terminate before the extremities of the propeller disc, and a detachable structure which is releasably fixed to these arms and where the flexible connection can pass through this detachable section.

4. The multi-rotor UAV of clause 1, further comprising arms which terminate in a protruding structure resembling the capital letters L, T, or Y, these protrusions being wider than the arms but designed so as not to interfere with each other when multiple arms are folded into the packed position.

5. The multi-rotor UAV of clause 1, further comprising a flexible connection between any two non-adjacent arms passing through the intervening arms.

6. The multi-rotor UAV of clause 1, further comprising a flexible connection completing a closed connection around the entire structure and passing through all arms.

BRIEF DESCRIPTION OF THE DRAWINGS

Detailed embodiments of the disclosure will now be described in conjunction with the accompanying drawings of which:

FIGS. 10a and 10b are views of a detachable cover engaging a body of a UAV;

DETAILED DESCRIPTION OF SPECIFIC EMBODIMENTS

The present disclosure seeks to provide an improved UAV and an improved propeller guard for a UAV. While various embodiments of the disclosure are described below, the disclosure is not limited to these embodiments, and variations of these embodiments may well fall within the scope of the disclosure which is to be limited only by the appended claims.

UAV and Flexible Propeller Guard

Figure 1:
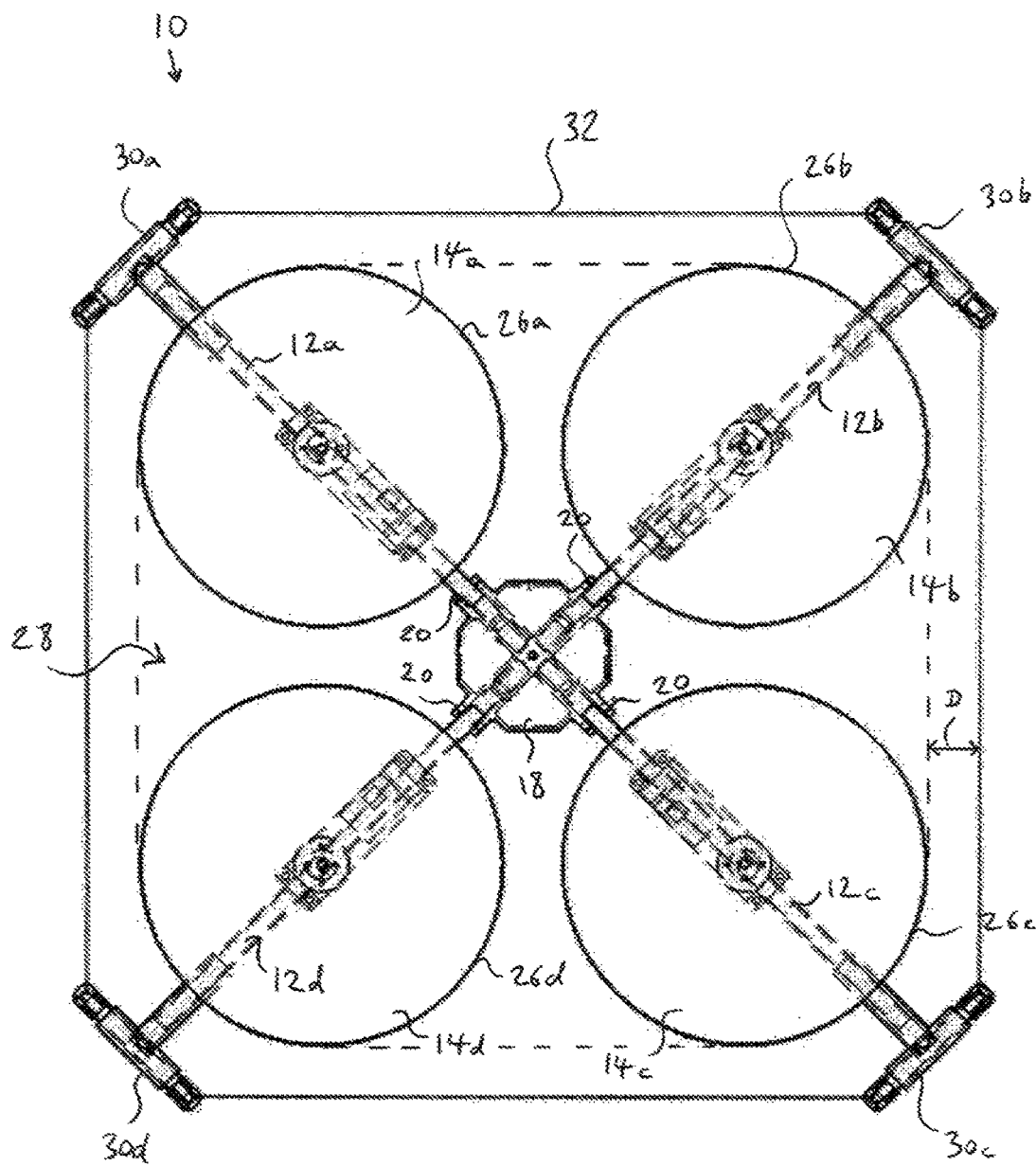
FIG. 1 is top-down of a UAV according to an embodiment of the disclosure.
Figure 5:
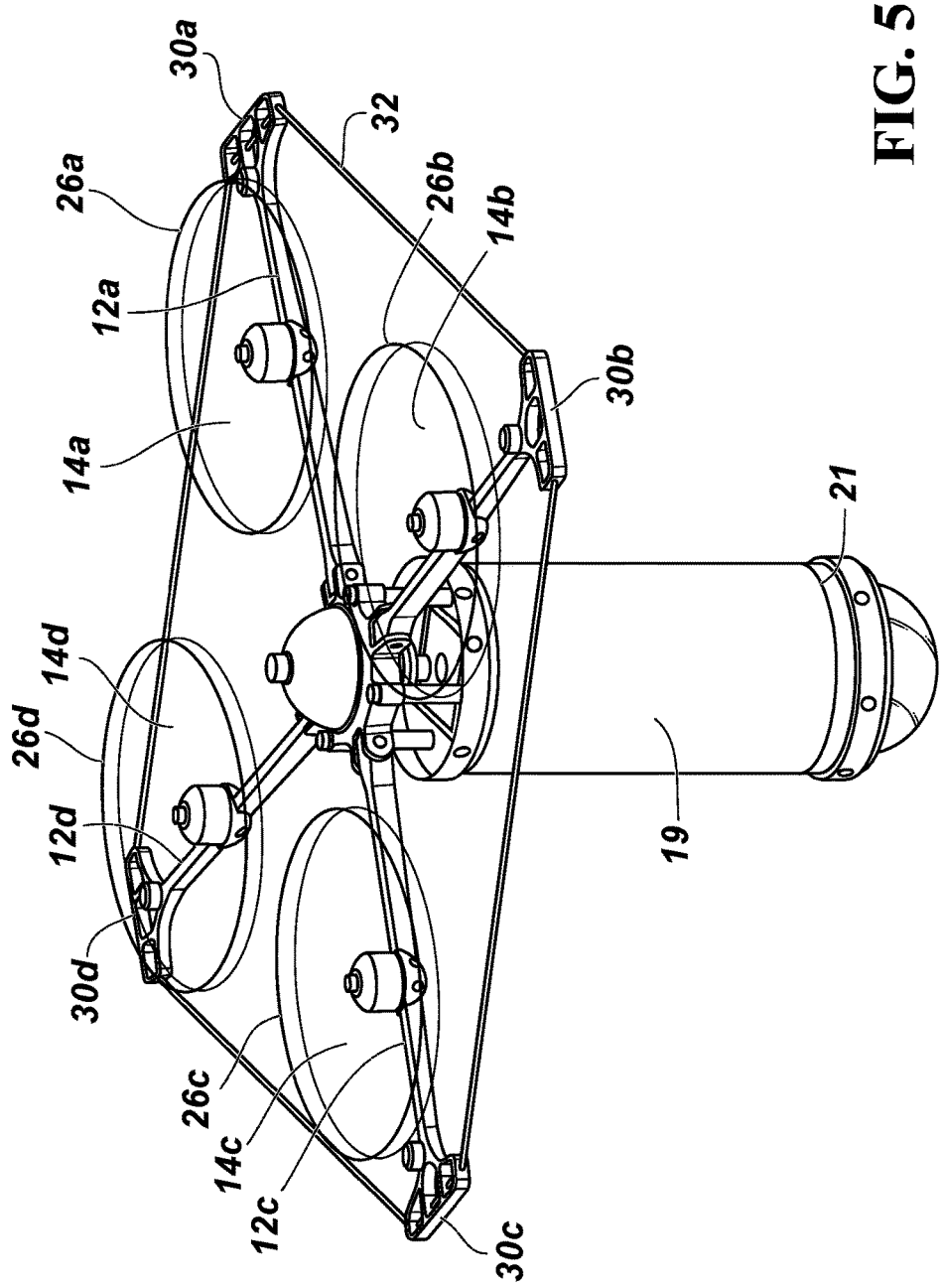
FIG. 5 is a perspective view of the UAV of FIGS. 1 and 2.

In accordance with an embodiment of the disclosure, there is shown in FIG. 1 a top-down view of a UAV 10. The same UAV 10 is seen from the side in FIG. 2. A perspective view of UAV 10 is shown in FIG. 5. UAV 10 is a multi-rotor UAV in that it comprises multiple propellers 14a-d for providing lift to UAV 10. Each propeller is driven by a motor 16 and is attached to a respective arm 12a-d. In the present embodiment, UAV 10 includes four arms 12a-d and four corresponding propellers 14a-d, although it is to be understood that within the scope of this disclosure the UAV may comprise any number of arms and any number of propellers. The UAV may therefore be a tricoptor, a quadcopter, etc.

Arms 12a-d extend symmetrically and radially outwardly from a central hub 18. As will be described in more detail below, each of arms 12a-d may independently pivot or rotate about a hinge 20, thereby moving from a deployed configuration (as in FIG. 1) to a stored configuration (as in FIG. 6). When UAV 10 is viewed side-on, as in FIG. 2, propellers 14a-d are seen to rotate in a common plane, propeller plane 22. Arms 12a-d extend in a separate common plane, arm plane 24, beneath propeller plane 22. Although propellers 14a-d rotate in a common plane, the disclosure embraces embodiments in which each propeller includes blades that sweep in two different parallel planes, for example one plane above arm plane 24 and one plane below arm plane 24. Still further, and as will be described in more detail below, in some embodiments the plane of rotation of each propeller may be tilted slightly relative to propeller plane 22 (for example as seen in FIG. 3). Furthermore, in other embodiments the arms need not be symmetrically positioned relative to central hub 18, and the propellers need not be symmetrically distributed on the arms.

Figure 2:
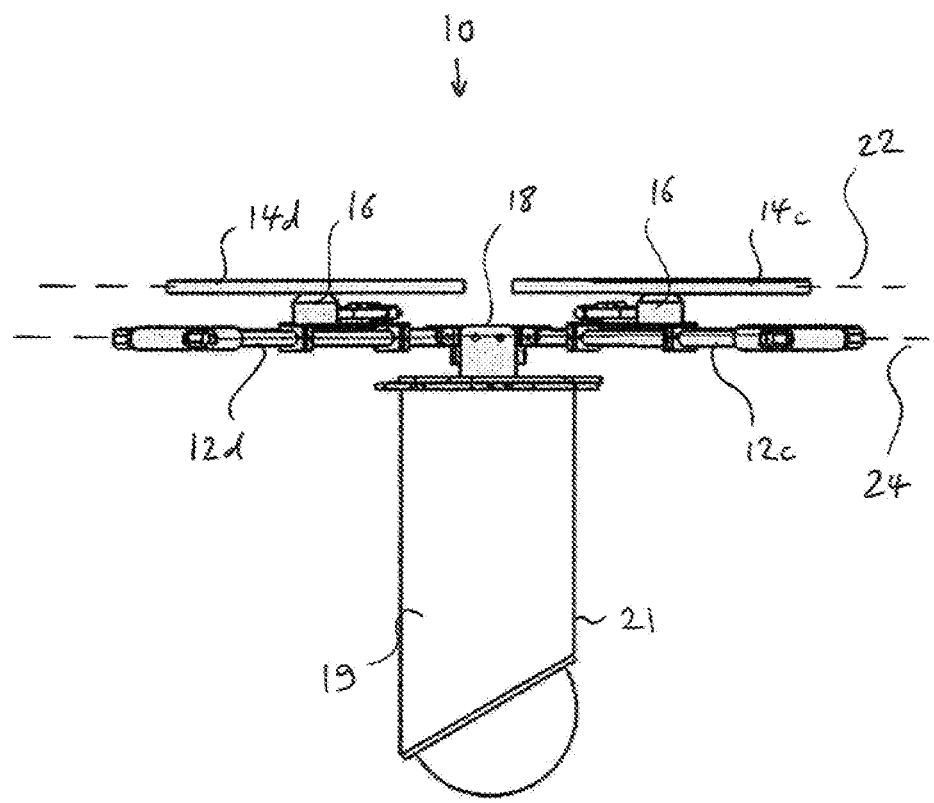
FIG. 2 is side-on view of the UAV of FIG. 1.
Figure 3:
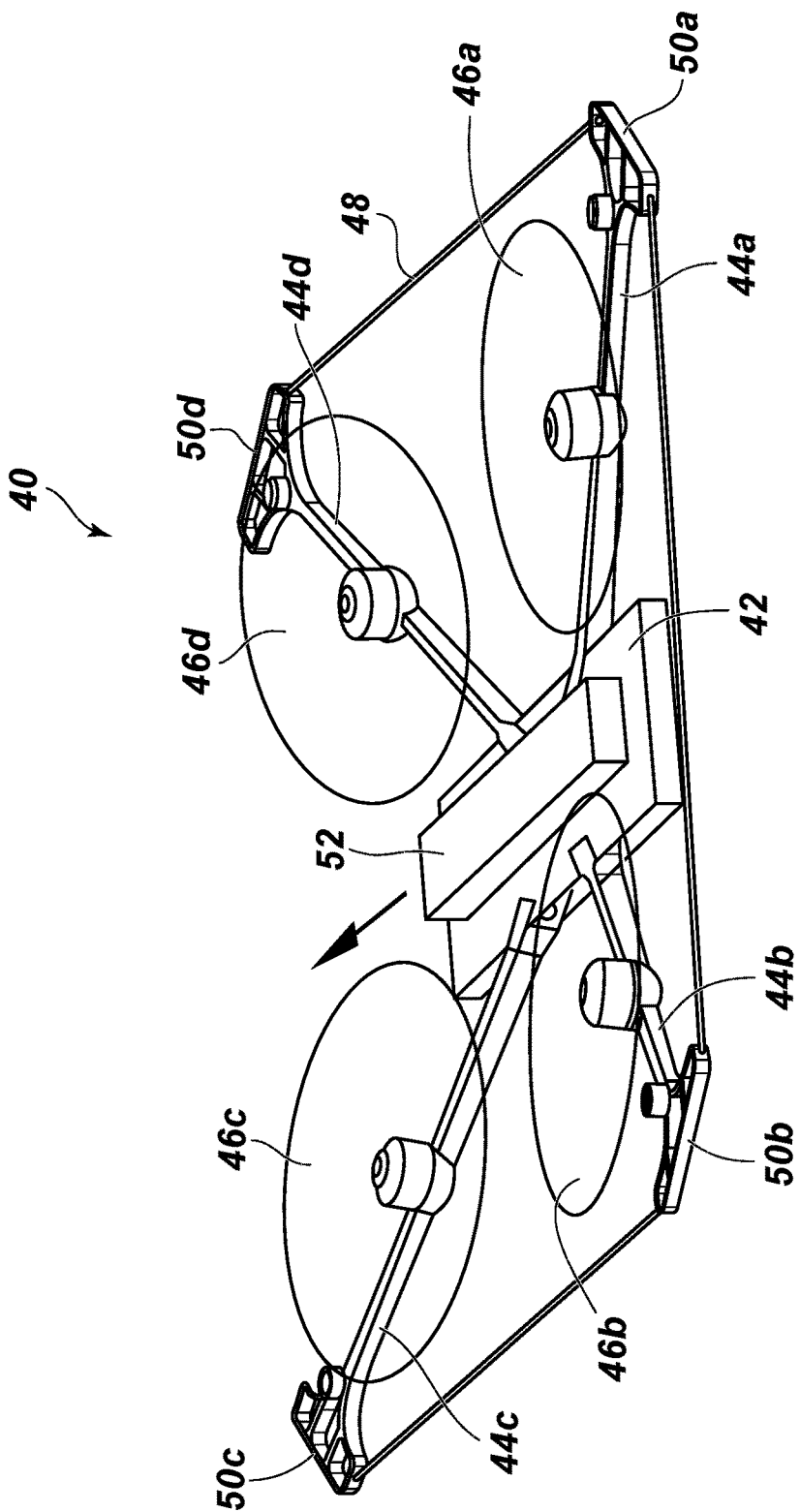
FIG. 3 is perspective view of a UAV according to an embodiment of the disclosure.

As seen in FIG. 2, central hub 18 is positioned at a top end of a body 19 which extends vertically downwards away from propeller plane 22 and arm plane 24. A detachable cover 21, described in more detail later, encloses body 19. Body 19 houses a number of various flight electronic components (not seen) for allowing UAV 10 to perform its various functions. In particular, body 19 houses one or more cameras positioned to image the environment in which UAV 10 is flown. Image data captured by the one or more cameras may be stored in a memory. UAV 10 further includes an RF transceiver for communicating with a remote device such as a remote controller operated by a user. Body 19 further houses an energy storage device such as a lithium polymer battery for providing power to the flight electronics. Body 19 further houses a processor such as a flight control computer for processing instructions from the user and controlling operation of the various flight electronics of UAV 10, such as the one or more cameras and motors 16 operating propellers 14a-d. As known in the art, a user may send instructions wirelessly to UAV 10, the instructions being detected by the RF transceiver and sent to the processor. The processor may then interpret the instructions and control operation of motors 16, the one or more cameras, and any other electronic components included on UAV 10.

Each propeller 14a-d is positioned approximately midway along each respective arm 12a-d, and is driven by a respective motor 16. When in operation, each propeller 14a-d sweeps at any given point in time a corresponding circular area of rotation 26a-d as the blades of each propeller rotate. At any given point in time, areas of rotation 26a-d at least partially define and are comprised in a propeller operation zone 28. Propeller operation zone also 28 includes the area extending between areas of rotation 26a-d, as depicted by the dashed lines in FIG. 1. This assumes that propellers 14a-d are rotating in propeller plane 22. In some embodiments (such as the embodiment of FIG. 3), the propellers are tilted slightly relative to propeller plane 22, and therefore in such a case propeller operation zone 28 includes the volume extending between areas of rotation 26a-d.

At the end of each arm 12a-d is a respective T-shaped member 30a-d. Each T-shaped member 30a-d terminates at a point beyond propeller operation zone 28. The T-shape, and in particular the crossbar of each "T", increases the extension of each arm 12a-d beyond propeller operation zone 28. In the present embodiment, T-shaped members 30a-d are integrally formed with arms 12a-d, although in other embodiments T-shaped members 30a-d may be detachable components that are fitted onto, or otherwise coupled to, the ends of arms 12a-d.

Figure 4:
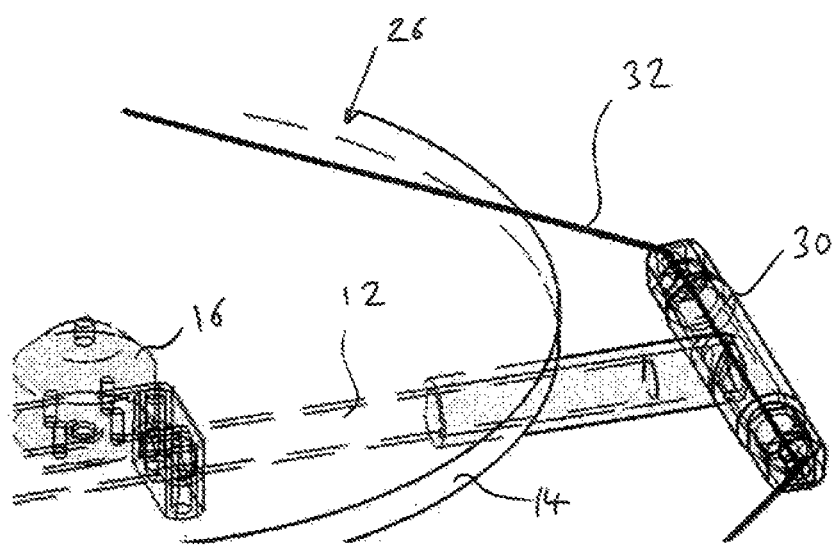
FIG. 4 is a magnified view of an end of an arm.

UAV 10 further comprises a flexible propeller guard, which in the present embodiment is cord 32. Cord 32 is threaded through each T-shaped member 30a-d such that cord 32 extends from each T-shaped member 30a-d to the next. The threading of cord 32 through one of T-shaped members 30a-d is shown in more detail in FIG. 4. The ends of cord 32 (not seen) may be fused, crimped, or otherwise joined together, such that cord 32 forms an unbroken perimeter around propeller operation zone 28. As cord 32 is threaded through each T-shaped member 30a-d, cord 32 is movably joined to each arm 12a-d such that cord 32 may be slid through each T-shaped member 30a-d. Thus, any point on cord 32 may be moved from one side of a T-shaped member 30a-d to the other side of the T-shaped member 30a-d. As seen in FIG. 1, cord 32 extends beyond propeller operation zone 28. In particular, as the ends of arms 12a-d extend beyond propeller operation zone 28, cord 32 is also spaced by a minimum distance D from propeller operation zone 28, when viewing UAV 10 along an axis of rotation of propellers 14a-d (i.e. as in FIG. 1). During controlled flight of UAV 10, cord 32 reduces the risk that objects within the flight path of UAV 10 will collide with propellers 14a-d, since cord 32 will cause UAV 10 to be resiliently repelled from any such objects.

FIG. 3 shows an alternative embodiment of a UAV 40. UAV 40 is similar to UAV 10 in that it includes a central hub 42, arms 44a-d extending radially away from central hub 42, and a propeller 46a-d positioned approximately midway along each arm 42a-d. Like UAV 10, UAV 40 also includes a cord 48 extending between pairs of adjacent T-shaped members 50a-d forming the ends of arms 44a-d. Unlike UAV 10, however, UAV 40 includes a camera 52 positioned such that its field of view includes a line extending between T-shaped member 50c and T-shaped member 50d. Thus, cord 48 extends between only three pairs of T-shaped members 50a-d: T-shaped member 50d and T-shaped member 50a, T-shaped member 50a and T-shaped member 50b, and T-shaped member 50b and T-shaped member 50c. This ensures that the field of view between arms 44c and 44d is unobstructed by cord 48. Note that arms 44a-d are tilted slightly relative to the horizontal (this may be achieved using set screws as described later).

Foldability

Figure 6:
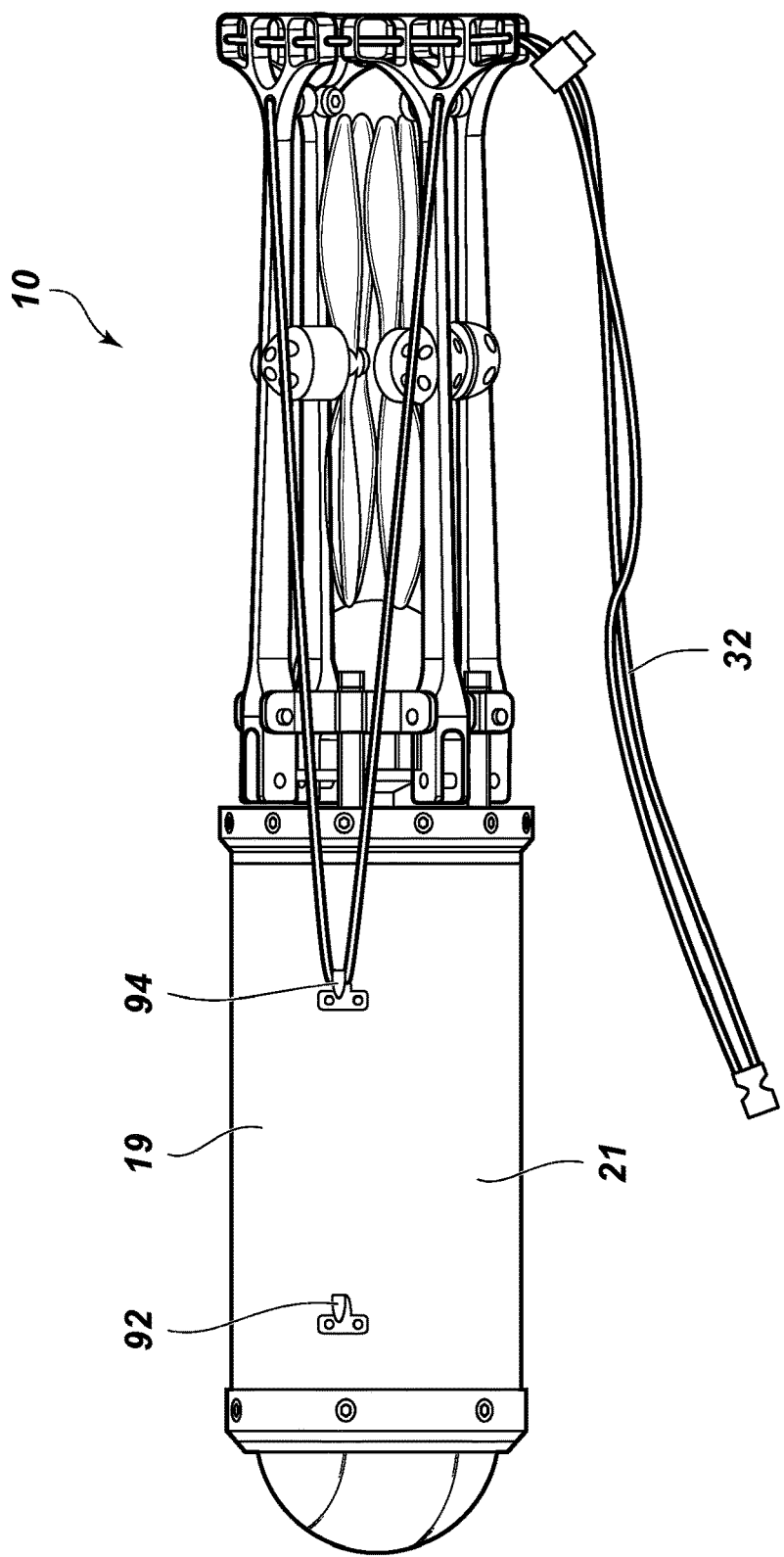
FIG. 6 is a perspective view of an arm lock according to an embodiment of the disclosure.

As mentioned above, UAV 10 is of the folding type such that arms 12a-d are movable between a radially extending, deployed configuration (FIG. 1) and a folded, stored configuration (FIG. 6). In FIGS. 1, 2 and 5, arms 12a-d are shown in the fully deployed configuration, with propellers 14a-d positioned so as to rotate within propeller plane 22. For ease of transportation, and when storing UAV 10, arms 12a-d may be moved from the deployed configuration to the stored configuration, as seen in FIG. 6. To obtain the stored configuration, arms 12a-d are rotated about hinges 20, pivoting inwardly towards each other until they are substantially parallel with one another and in line with body 19. T-shaped members 30a-d are sized so as not to interfere with each other when UAV 10 is in the stored configuration.

Figure 7:
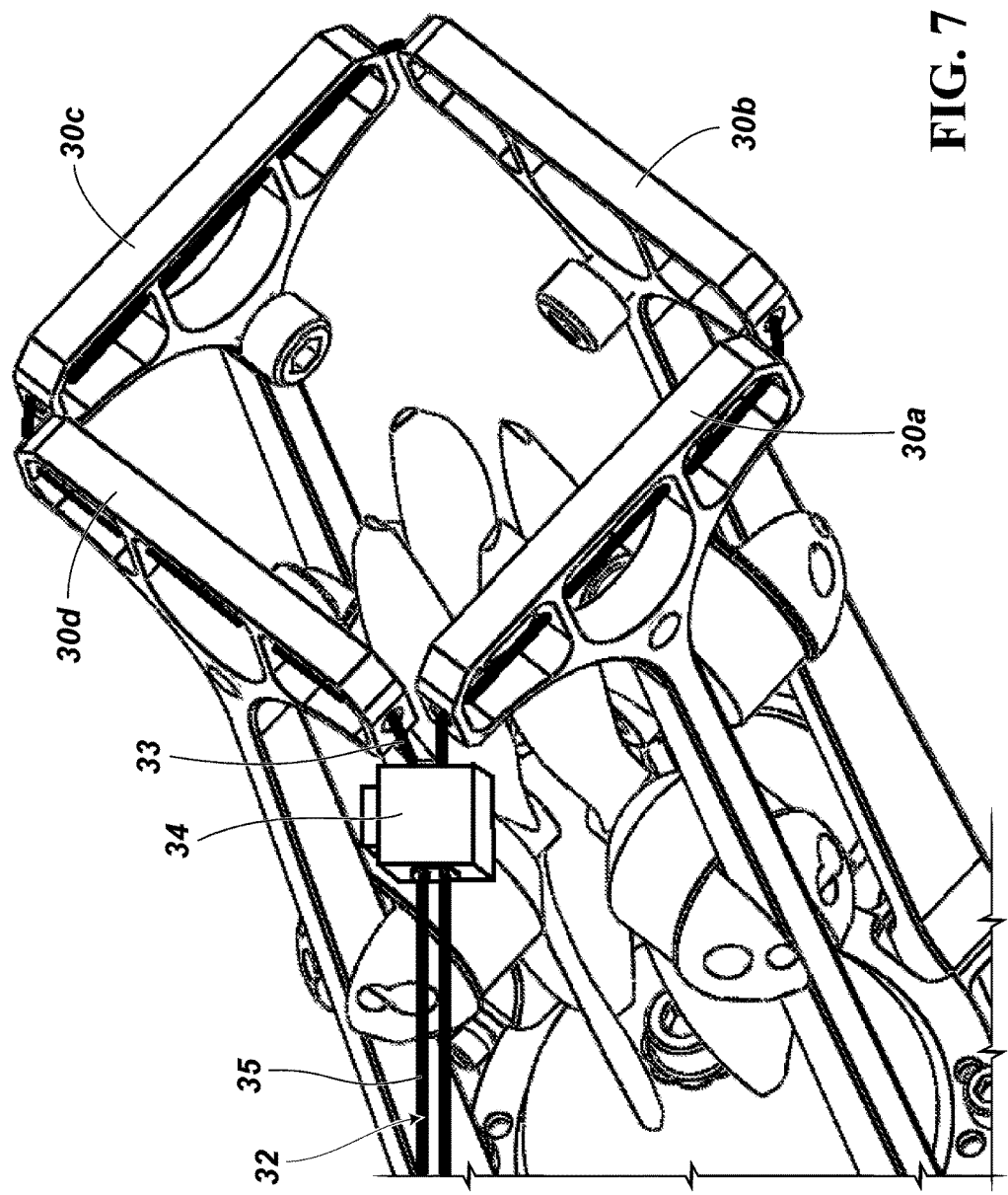
FIG. 7 is a view of a cord lock according to an embodiment of the disclosure.

Because of the movable joining of cord 32 to each T-shaped member 30a-d, cord 32 may be moved through T-shaped members 30a-d to achieve the arrangement shown in FIGS. 6 and 7. In FIG. 7 in particular, a relatively small length 33 of cord 32 links T-shaped member 30a, T-shaped member 30b and T-shaped member 30c. A much larger length 35 of cord 32 links T-shaped member 30d to T-shaped member 30a. Length 35 of cord 32 may be wrapped around folded arms 12a-d in order to secure arms 12a-d together and restrain them in the stored configuration. A knot may be tied in cord 32 so that cord 32 does not unintentionally unwrap itself.

In order to obtain the deployed configuration from the stored configuration, each arm 12a-d is rotated about hinges 20 until arms 12a-d are positioned within arm plane 24, extending radially outwardly from central hub 18.

Drawcord

FIG. 7 shows an embodiment of UAV 10 where cord 32 is threaded through a cord lock 34 which exerts a clamping force on cord 32. When cord lock 34 is opened, cord lock 34 may be moved along cord 32 to vary the respective lengths 33 and 35 of cord 32 on each side of cord lock 34. When cord lock 34 is closed, cord lock 34 exerts a clamping force on cord 32, thereby fixing length 33 of cord 32 on one side of cord lock 34 relative to length 35 of cord 32 on the other side of cord lock 34.

Thus, with arms 12a-d in the stored configuration, cord lock 34 may be moved along cord 32 to a point adjacent T-shaped members 30a and 30d (as seen in FIG. 7), thereby minimising length 33 of cord 32 between T-shaped members 30a-d. Cord lock 34 may then be closed so as to exert a clamping force on cord 32, thereby preventing arms 12a-d from unfolding, since length 33 of cord 32 extending between T-shaped members 30a-d is fixed. Length 35 of cord 32 forms a loop and may be used to carry packed or stored UAV 10.

Detachable Cover

As described above in connection with FIG. 1, UAV 10 comprises a body 19 extending downwardly away from central hub 18. UAV 10 also includes detachable cover 21 configured to protect and enclose body 19. Detachable cover 21 is engaged with UAV 10 by inserting body 19 into detachable cover 21 and fixing detachable cover 21 to UAV 10.

Figure 8B:
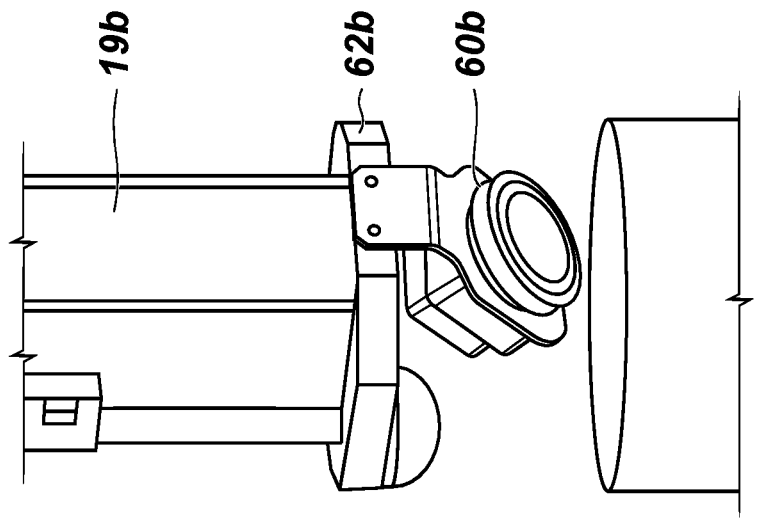
FIGS. 8a and 8b are perspective views of bodies of a UAV, in accordance with embodiments of the disclosure.
Figure 8A:
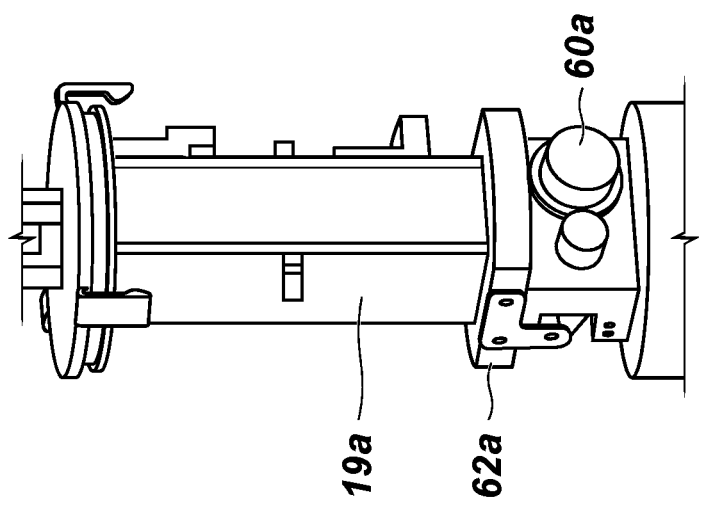

FIGS. 8a and 8b show two different embodiments of a UAV body 19A, 19B. The principal difference between the two is that UAV body 19A includes a camera 60A with a rotatable field of view while UAV body 19B includes a camera 60B with a fixed field of view. UAV bodies 19A, 19B include rib sections 62A, 62B for guiding insertion of bodies 19A, 19B into the detachable cover. Rib sections 62A, 62B are configured to mate closely with the detachable cover such that when the detachable cover is secured to the UAV's body, impacts to the detachable cover are transmitted through rib sections 62A, 62B and into the body. This has the effect of reducing the thickness and weight requirements of the detachable cover.

Figure 9B:
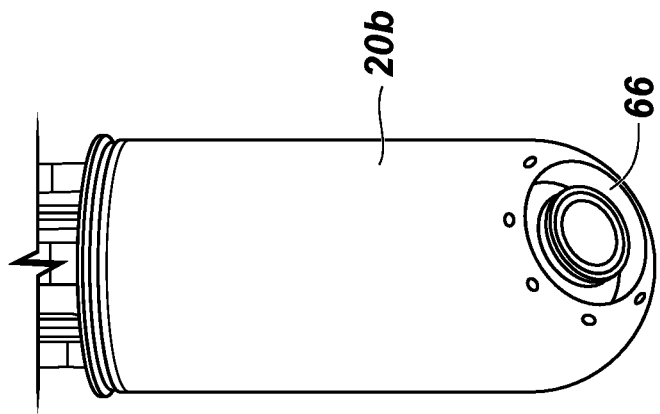
FIGS. 9a and 9b are perspective views of detachable covers, in accordance with embodiments of the disclosure.
Figure 9A:
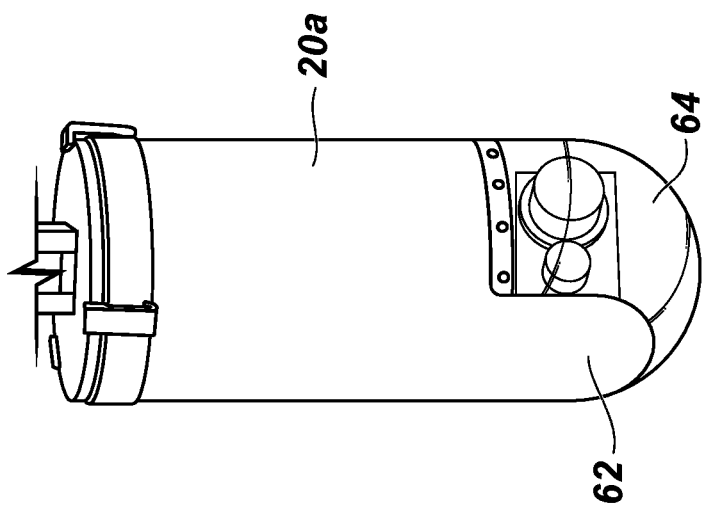

FIGS. 9A and 9B show embodiments of detachable covers, or shells 21A and 21B, for use with bodies 19A, 19B. Shells 21A includes a hollow, waterproof enclosure with a hemispherical portion 62 at one end. Shell 21A is positioned over body 19A by inserting body 19A within shell 21A. Hemispherical portion 62 includes a transparent window 64. Transparent window 64 is shaped as a portion of a spherical shell, such that the field of view defined by camera 60A is not obstructed by shell 21A when shell 21A is locked to UAV 10. Shell 21B is similar to shell 21A, except that in this embodiment transparent window 66 is shaped as a smaller portion of a spherical shell. In either embodiment rivets along the edge of the transparent window 64, 66 affix transparent window 64, 66 to shell 21A, 21B, and the resulting joint is sealed to prevent water ingress.

FIGS. 10a and 10b show an embodiment of a UAV in which detachable cover, or shell 21, is attached to body 19. Shell 21 seals against an O-ring 68 in a radial groove formed in a circular lid piece 70 of body 19. Hooks 74 on lid piece 70 engage with a ring piece 76 encircling an end of shell 21, to lock shell 21 to body 19 (as seen in FIG. 10b). Lid piece 70 includes a vent 72 formed therein to allow pressure to equalize between the interior and exterior of shell 21, for aircraft altitude control using a barometer. Vent 72 is covered by a waterproof membrane of ePTFE material to prevent water from entering the enclosure formed by shell 21 coupled to body 19. Additional holes (not seen) are formed within lid piece 70 and allow the passage of motor and control wires from inside the enclosure to motors 16 mounted on arms 12a-12d. These holes are then sealed using liquid sealant compounds.

Arm Locks

Figure 11B:
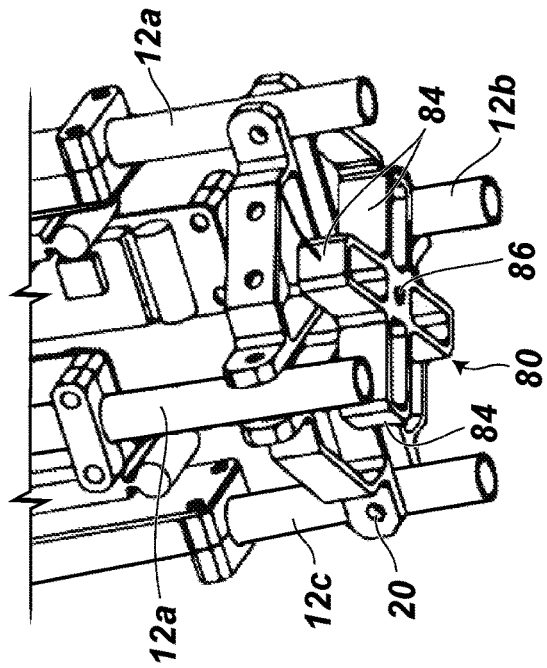
FIGS. 11a and 11b are views of an arm lock, in accordance with an embodiment of the disclosure.
Figure 11A:
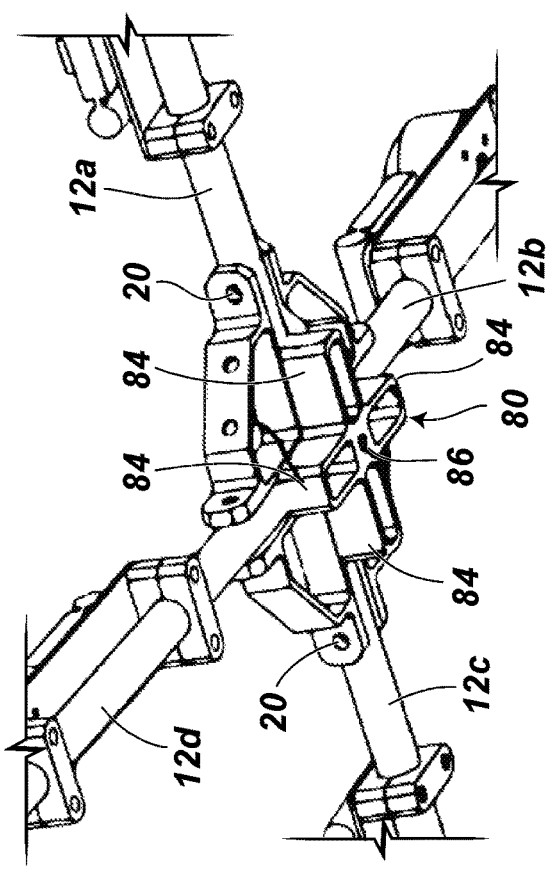

In FIGS. 11a and 11b, there is shown an embodiment of an arm locking device for locking arms 12a-12b in the deployed configuration. The arm locking device comprises a cross-shaped member 80 formed of four elongate portions 84. Elongate portions 84 extend radially outwardly from a central point 86, at right angles to each other. Cross-shaped member 80 is rotatably coupled to central hub 18 such that cross-shaped member 80 is configured to rotate about an axis of rotation parallel to the axes of rotation of propellers 14a-d. Cross-shaped member 80 is rotatable between a first, closed position (seen in FIG. 11a) and a second, open position (seen in FIG. 11b). For clarity, the body of the UAV is not shown in FIGS. 11a and 11b.

In the closed position, elongate portions 84 extend parallel to and adjacent ends of arms 12a-d. Thus, arms 12a-d are blocked from rotating about hinges 20 from the deployed configuration to the stored configuration. When wising to move arms 12a-d from the deployed configuration to the stored configuration, cross-shaped member 80 is rotated by 45 degrees to the open position seen in FIG. 11b, wherein elongate portions 84 extend between ends of arms 12a-d. Thus, in the open position, ends of arms 12a-d are no longer blocked from rotation by elongate portions 84, and arms 12a-d may be rotated from the deployed configuration to the stored configuration.

Figure 12B:
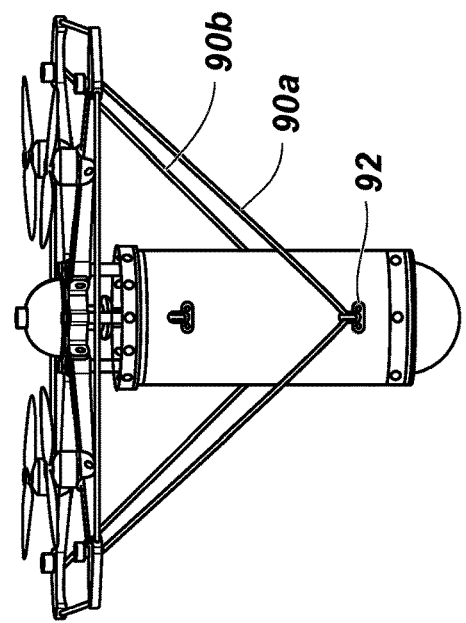
FIGS. 12a and 12b are views of an arm lock, in accordance with an embodiment of the disclosure.
Figure 12A:
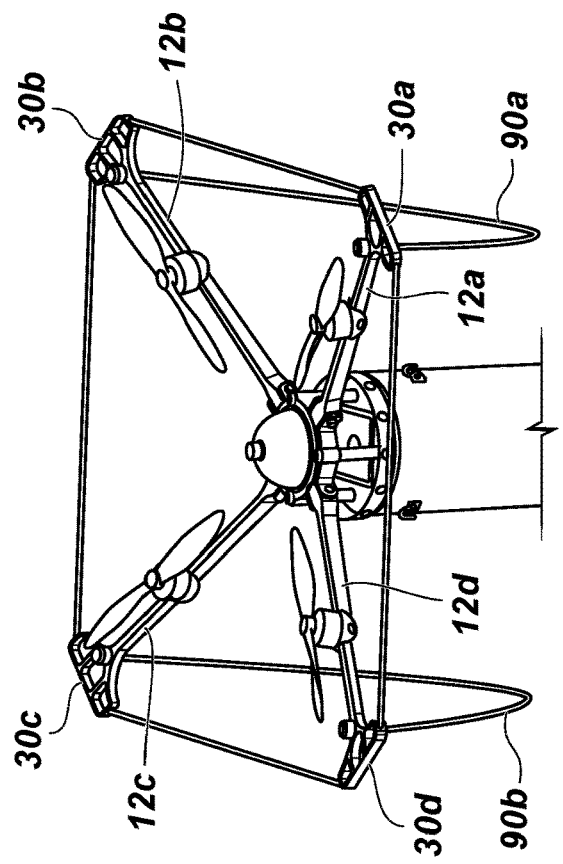

FIG. 12a shows a further embodiment of an arm locking device. In this embodiment, the arm locking device comprises two elongate, elastic members 90a,b, each connected to a pair of arms: 12a and 12b, and 12c and 12d. One end of elastic member 90a is connected to T-shaped member 30a of arm 12a, and the other end of elastic member 90a is connected to T-shaped member 30b of arm 12b. Similarly, one end of elastic member 90b is connected to T-shaped member 30c of arm 12c, with the other end of elastic member 90b is connected to T-shaped member 30d of arm 12d.

When arms 12a-d are in the deployed configuration, elastic members 90a,b may be attached to hooks 92 (one of which is not seen) positioned on shell 21, as seen in FIG. 12b. Due to their elasticity, when attached to hooks 92, elastic members 90a,b are tensioned and restrain arms 12a-b in the deployed configuration. In order to allow arms 12a-d to fold into the stored position, elastic members 90a,b are detached from hooks 92.

When in the stored configuration, elastic members 90a,b may also be used to secure detachable cover 21 over body 19. Returning to FIG. 6, detachable cover 21 includes hooks 94 (one of which is not seen) positioned relatively closer to central hub 18 than hooks 92 (one of which is not seen). With arms 12a-d in the stored configuration, elastic members 90a,b may be attached to hooks 94. Due to their elasticity, when attached to hooks 94, elastic members 90a,b are tensioned and restrain detachable cover 21 over body 19. Elastic members 90a,b may be used in addition to hooks 74 (described in connection with FIGS. 10a and 10b) so as to provide additional securing of detachable cover 21 over body 19. In order to remove detachable cover 21 from body 19, elastic members 90a,b are detached from hooks 94.

In the present embodiment, hooks 92 and 94 are integrated into fiberglass forming shell 21. Hooks 92 and 94 may be formed of any suitable material, such as steel, aluminium, or fiberglass. In addition, in other embodiments, elastic members 90a,b need not be attached to T-shaped members 30a-d, but instead may be attached to other points on arms 12a-d.

Figure 13B:
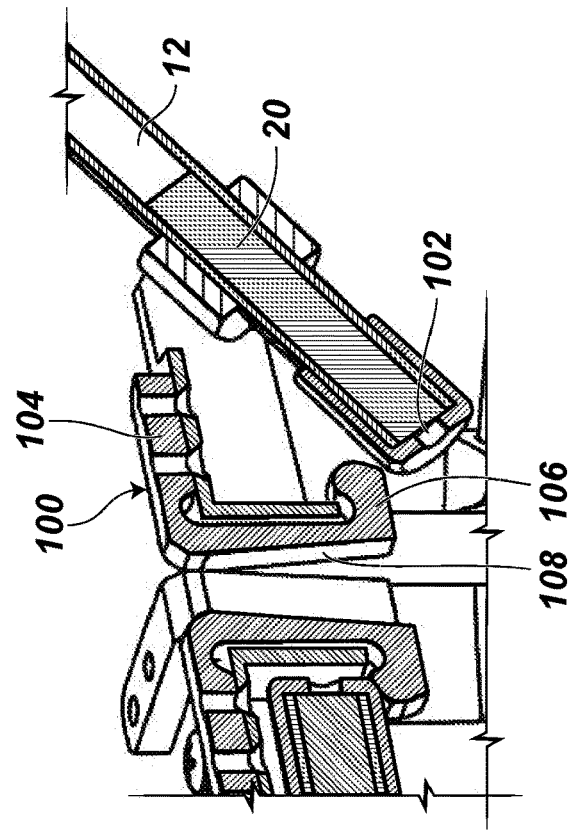
FIGS. 13a and 13b are views of an arm lock, in accordance with an embodiment of the disclosure.
Figure 13A:
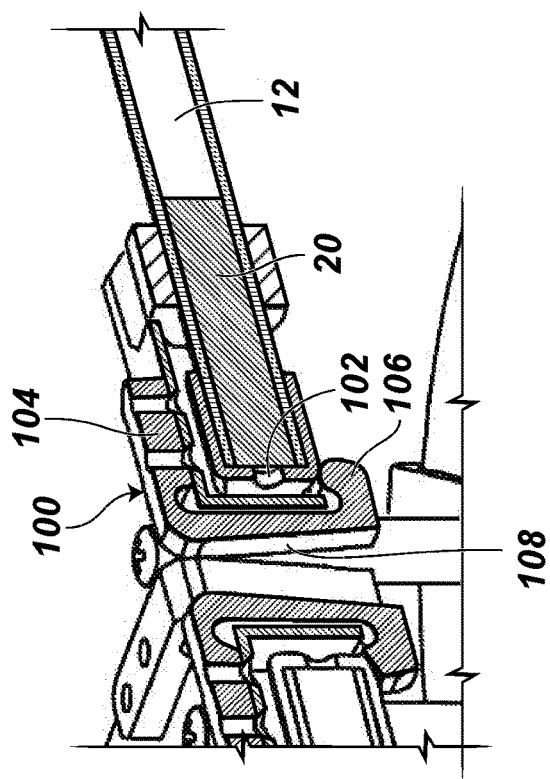

A further embodiment of an arm locking device is shown in FIGS. 13a and 13b. Central hub 18 (shown greyed out for clarity) includes resiliently deformable snap hooks 100 positioned so as to engage with ends 102 of arms 12a-d when in the deployed configuration. Each snap hook 100 includes an upper member 104 extending along a longitudinal direction of an arm 12 (one of arms 12a-d), and a shorter, lower member 106 extending along the longitudinal direction of arm 12. Upper and lower members 104 and 106 are connected via an upright member 108. Snap hook 100 may be formed of any suitable material, such as polycarbonate.

FIG. 13a shows an end 102 of arm 12 engaged with snap hook 100. The height of arm 12 is slightly greater than the distance separating upper member 104 from lower member 106, and therefore arm 12 is resiliently restrained within snap hook 100, between upper and lower members 104 and 106. When moving arm 12 from the deployed configuration to the stored configuration, rotation of arm 12 about hinge 20 urges upper member 104 away from lower member 106 until arm 12 is freed from snap hook 100. Due to its resilient deformability, snap hook 100 reassumes its original shape once arm is released from snap hook 100. A user may assist the release of arm 12 from snap hook 100, for example by manually deflecting upper member 104 sufficiently such that arm 12 is released from snap hook 100.

In order to re-engage arm 12 with snap hook 100, arm 12 is rotated from the stored configuration to the deployed configuration. During rotation, arm 12 contacts the under-side of upper member 104 which deflects until arm 12 is fully received between upper member 104 and lower member 106.

Biasing Screws

Figure 14:
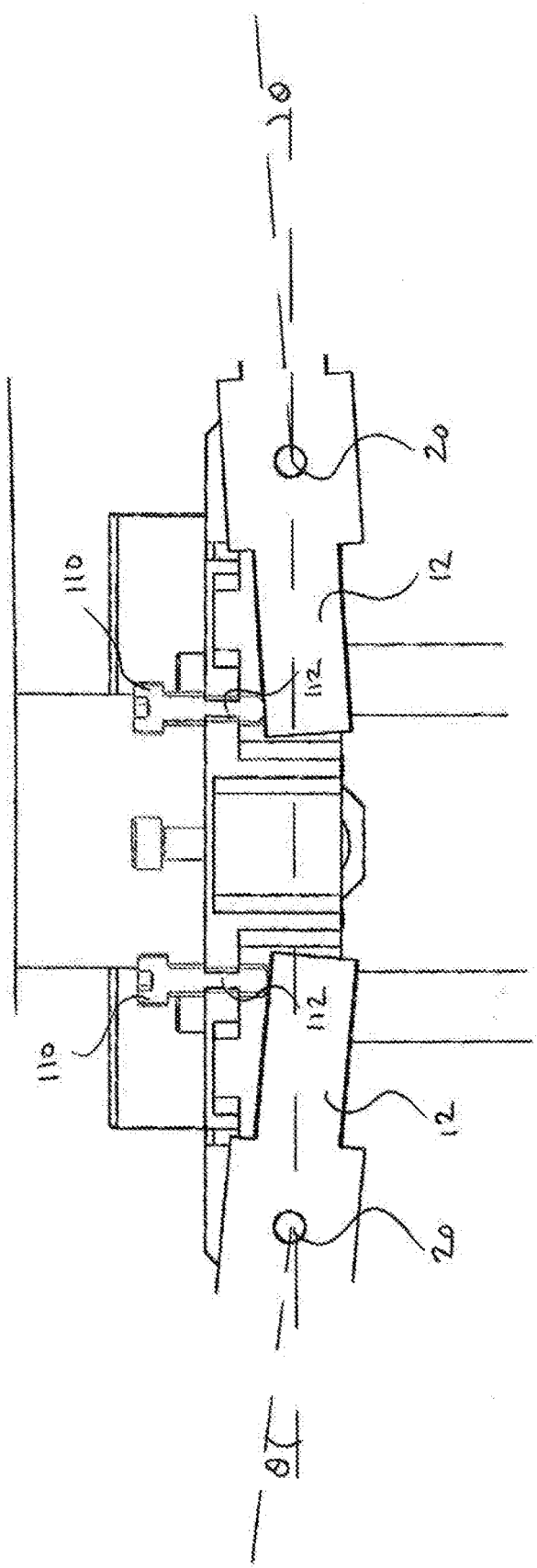
FIG. 14 is a cross-sectional view of an arm biasing device, in accordance with an embodiment of the disclosure.

FIG. 14 shows an embodiment of arm biasing devices. The arm biasing devices may be used to tilt slightly the planes of rotation of propellers 14a-d, by tilting arms 12a-d slightly towards the stored configuration. Such tilting can improve flight stability.

The arm biasing devices comprise a number of set screws 110 arranged to bias arms 12 towards the stored configuration. Set screws 110 are positioned within apertures 112 formed within central hub 18. Each set screw 110 may be moved through its aperture 112 by increments into contact with an end of an arm 12. After contact of set screw 110 with arm 12, further translation of set screw 110 will cause arm 12 to tilt slightly towards the stored configuration. In FIG. 14, it can be seen that set screws 110 have been translated through apertures 112 to tilt arms 12 slightly by an angle θ (defined relative to arm plane 24). An embodiment of a UAV with slightly tilted arms is shown in FIG. 3.

Cargo Containers

Figure 15:
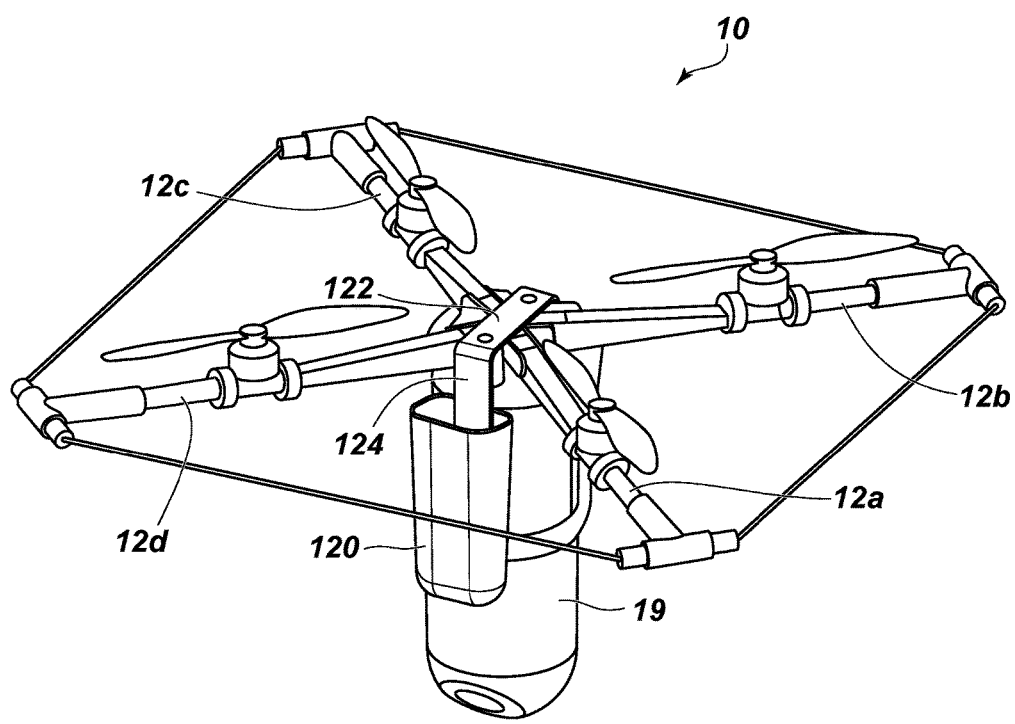
FIG. 15 is a perspective view of a UAV with cargo containers, according to an embodiment of the disclosure.

FIG. 15 shows an embodiment of UAV 10 with a pair of cargo panniers 120. Panniers 120 allow UAV 10 to carry cargo during flight. Panniers 120 are attached to a U-shaped coupling 122 which is fixed (e.g. by bolts) over central hub 18. U-shaped coupling 122 includes a pair of prongs 124 (one of which is not seen) extending perpendicularly away from arm plane 24. Attached to each prong 124 is one of cargo panniers 120, sized to receive various objects such as emergency blankets, radios, water bottles, etc.

In other embodiments, coupling 122 is not bolted to central hub 18 but instead is removably positioned over central hub 18 so that coupling 122 can be easily removed and repositioned in the field. In such a case a strap or similar elastic member may encircle body 19 and panniers 120 to hold panniers 120 in place relative to body 19. Panniers 120 are positioned to minimise a shift in the center of gravity of UAV 10, and are furthermore located out of the way of propeller downwash. Panniers 120 may include re-sealable covers, such as zippable or foldable covers allowing the interior of panniers 120 to be separated from the exterior environment.

If UAV 10 is used with the arm locking device described in connection with FIGS. 12a and 12b, then elastic member 90a will be attached to arms 12a and 12b, and elastic member 90b will be attached to arm 12c and 12d, so as not to interfere with panniers 120. Similarly, hooks 92 and 94 will be positioned between panniers 120.

One or more example embodiments have been described by way of illustration only. This description is been presented for purposes of illustration and description, but is not intended to be exhaustive or limited to the form disclosed. Many modifications and variations will be apparent to those of ordinary skill in the art without departing from the scope of the claims. It will be apparent to persons skilled in the art that a number of variations and modifications can be made without departing from the scope of the claims. It is furthermore contemplated that any part of any aspect or embodiment discussed in this specification can be implemented or combined with any part of any other aspect or embodiment discussed in this specification.

What is claimed:

1. An unmanned aerial vehicle (UAV) comprising:
one or more propellers defining, during operation of the one or more propellers, a propeller operation zone comprising one or more areas swept by the one or more propellers;
a flexible propeller guard extending beyond at least a portion of the propeller operation zone such that, during flight of the UAV, the flexible propeller guard protects at least one of the one or more propellers from collision; and
a plurality of arms extending radially away from a body portion of the UAV, wherein at least one of the arms, when viewing the UAV along an axis of rotation of the one or more propellers, extends beyond the propeller operation zone, and wherein the arms are movable between a stored configuration, in which the arms are aligned with one another, and a deployed configuration, in which the arms extend radially away from the body portion,
wherein the flexible propeller guard is of a sufficient length that in the stored configuration the flexible propeller guard is wrappable around at least some of the arms so as to restrain the arms in the stored configuration.

2. The UAV of claim 1, wherein the UAV comprises multiple propellers, and wherein the propeller operation zone comprises the area or volume extending between each of the areas swept by the multiple propellers.

3. The UAV of claim 1, wherein, when viewing the UAV along an axis of rotation of the one or more propellers, the flexible propeller guard is spaced from at least one of the one or more areas swept by the one or more propellers.

4. The UAV of claim 1, wherein the flexible propeller guard is movably joined to at least some of the arms.

5. The UAV of claim 1, wherein the flexible propeller guard has a length such that in the deployed configuration the flexible propeller guard is tensioned so as to be resiliently deformable.

6. The UAV of claim 1, further comprising a locking device engageable with the flexible propeller guard and configured when engaged to fix, on one side of the locking device, a first length of the flexible propeller guard relative to, on the other side of the locking device, a second length of the flexible propeller guard.

7. The UAV of claim 1, further comprising a body portion and a removable cover configured to substantially enclose the body portion.

8. The UAV of claim 1, further comprising a first arm locking member movable between first and second positions such that, in the first position, movement of the arms into the stored configuration is blocked by the first arm locking member, and, in the second position, movement of the arms into the stored configuration is not blocked by the first arm locking member.

9. The UAV of claim 1, further comprising one or more arm biasing devices translatable relative to the arms so as, when in the deployed configuration, to exert a biasing force against at least one of the arms, the biasing force being directed to bias the at least one of the arms away from the deployed configuration.

10. The UAV of claim 1, wherein the flexible propeller guard extends beyond the entire propeller operation zone so as to form a complete perimeter around the UAV, when viewed along an axis of rotation of the one or more propellers.

11. The UAV of claim 1, wherein the flexible propeller guard extends beyond a portion of the propeller operation zone so as to form a partial perimeter around the UAV, when viewed along an axis of rotation of the one or more propellers.

12. The UAV of claim 1, further comprising one or more cargo containers.

13. An unmanned aerial vehicle (UAV) comprising:
one or more propellers defining, during operation of the one or more propellers, a propeller operation zone comprising one or more areas swept by the one or more propellers;
a flexible propeller guard extending beyond at least a portion of the propeller operation zone such that, during flight of the UAV, the flexible propeller guard protects at least one of the one or more propellers from collision;
a plurality of arms extending radially away from a body portion of the UAV, wherein at least one of the arms, when viewing the UAV along an axis of rotation of the one or more propellers, extends beyond the propeller operation zone, and wherein the arms are movable between a stored configuration, in which the arms are aligned with one another, and a deployed configuration, in which the arms extend radially away from the body portion;
a removable cover configured to substantially enclose the body portion; and
one or more arm locking members joined to at least one of the arms and attachable to the body portion or the removable cover, wherein the one or more arm locking members are of a length such that, when attached, the one or more arm locking members bias the arms into the deployed configuration.

14. The UAV of claim 13, wherein the one or more arm locking members are elastic.

15. An unmanned aerial vehicle (UAV) comprising:
one or more propellers defining, during operation of the one or more propellers, a propeller operation zone comprising one or more areas swept by the one or more propellers;
a flexible propeller guard extending beyond at least a portion of the propeller operation zone such that, during flight of the UAV, the flexible propeller guard protects at least one of the one or more propellers from collision;
a plurality of arms extending radially away from a body portion of the UAV, wherein at least one of the arms, when viewing the UAV along an axis of rotation of the one or more propellers, extends beyond the propeller operation zone, and wherein the arms are movable between a stored configuration, in which the arms are aligned with one another, and a deployed configuration, in which the arms extend radially away from the body portion; and
one or more resiliently deformable arm locking members positioned so as to exert a clamping force on one or more ends of the arms when in the deployed configuration, so as to inhibit movement of the one or more arms away from the deployed configuration, and configured so as to resiliently deform and release the one or more ends of the arms when sufficient force is applied to the one or more arm locking members.

* * * * *